United States Patent [19]

Kurosawa et al.

[11] Patent Number: 5,422,980
[45] Date of Patent: Jun. 6, 1995

[54] INFERENCE PROCESSING METHOD AND APPARATUS

[75] Inventors: Kenichi Kurosawa; Masaru Shimada, both of Hitachi; Tadaaki Bandoh, Ibaraki; Toshihiko Nakano; Toshihiro Hayashi, both of Hitachi, all of Japan

[73] Assignee: Hitachi, Ltd., Tokyo, Japan

[21] Appl. No.: 145,299

[22] Filed: Nov. 3, 1993

Related U.S. Application Data

[63] Continuation of Ser. No. 935,340, Aug. 27, 1992, abandoned, which is a continuation of Ser. No. 824,916, Jan. 22, 1992, abandoned, which is a continuation of Ser. No. 320,611, Mar. 8, 1989, abandoned.

[30] Foreign Application Priority Data

Mar. 9, 1988 [JP] Japan ................................ 63-53523

[51] Int. Cl.$^6$ .............................................. G06F 9/44
[52] U.S. Cl. ........................................ 395/10; 395/51; 395/75
[58] Field of Search ................. 395/64, 75, 77, 51, 395/52, 10

[56] References Cited

U.S. PATENT DOCUMENTS

| | | | |
|---|---|---|---|
| 4,628,434 | 12/1986 | Tashiro et al. | 364/130 |
| 4,648,044 | 3/1987 | Hardy et al. | 364/513 |
| 4,748,439 | 5/1988 | Robinson et al. | 340/146.2 |
| 4,803,641 | 2/1989 | Hardy et al. | 364/900 |
| 4,839,822 | 6/1989 | Dormond et al. | 364/200 |
| 4,847,784 | 7/1989 | Clancey | 364/513 |

OTHER PUBLICATIONS

Forgy, "Rete: A Fast Algorithm for the Many Pattern-/Many Object Pattern Match Problem", *Artificial Intelligence* 19 (1982) pp. 17–37.
Schor et al., "Advances in Rete Pattern Matching", Uncertainty and Expert Systems, 1986, pp. 226–232.
Winston et al., "Expert Problem Solving Using Rules and Streams", *LISP,* 1984, pp. 269–284.
Warren, "An Abstract Prolog Instruction Set," SRI International Technical Note No. 309, 1983, 1–30.
Abe, et al., "A New Optimization Technique for a Prolog Compiler," Compcon 86, Mar. 1986, 241–245.
Shintani, T., "An Approach to Speeding Up the Prolog-based Inference Engine KORE/IE," Proc. 6th Conf. on Logic Programming, Jun. 1987, 284–297.
Debray, S., "Register Allocation in a Prolog Machine," Proc. 1986 Symp. on Logic Programming, Sep. 1986, 267–275.

*Primary Examiner*—Robert W. Downs
*Attorney, Agent, or Firm*—Antonelli, Terry, Stout & Kraus

[57] ABSTRACT

A storage area for holding instantiation is provided together with a work area in order to rapidly generate a conflict set. When a condition of a rule is met, the instantiation of the rule is stored in the storage area in a form of data structure. The instantiation having an element whose attribute has been modified in an execution part of the rule is deleted from the conflict set.

2 Claims, 16 Drawing Sheets

FIG.2A
RULE
( Rule 1: if(X value=human being) then (modify (X value =die ) ))
FIG.2B
FACT
( Fact 1: Socrates value=human being )
FIG.3
EXECUTION OF FORWARD REASONING
(Fact 1: Socrates value=human being) – (C)
↓
(Rule 1: if (X value=human being))– (D1)
then (modify (X value=die) ) – (D2)
(Fact 2: Socrates value=die) – (E)

MECHANISM OF FORWARD REASONING

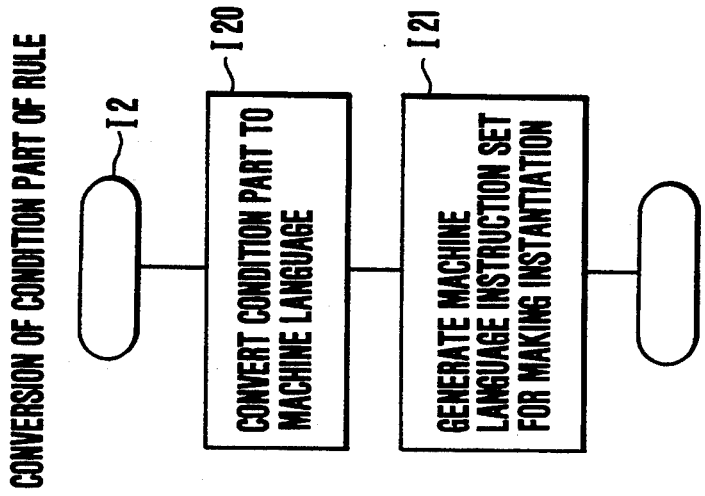
FIG.7 CONVERSION OF CONDITION PART OF RULE
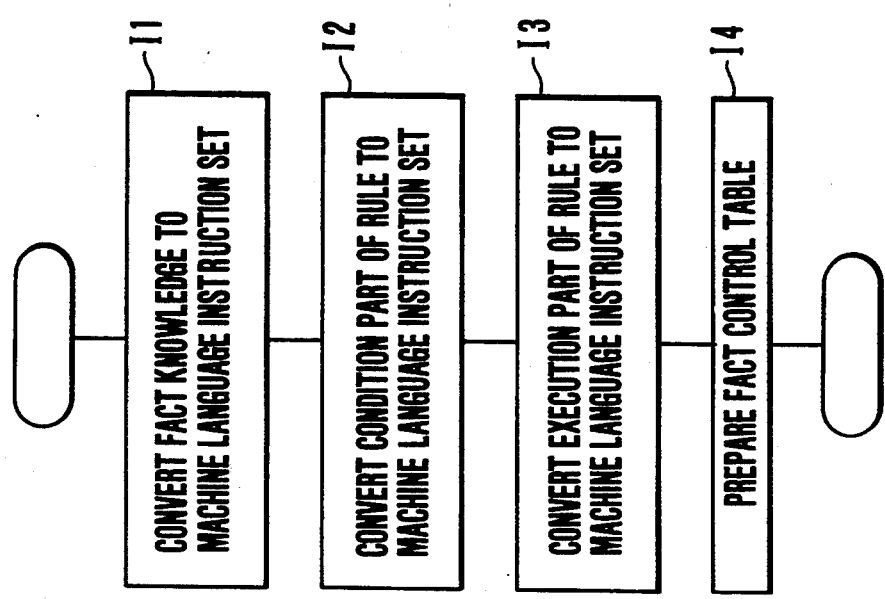
FIG.6

CONVERSION OF EXPRESSION OF FACT KNOWLEDGE TO MACHINE LANGUAGE INSTRUCTION SET

CONVERSION OF EXECUTION PART OF RULE

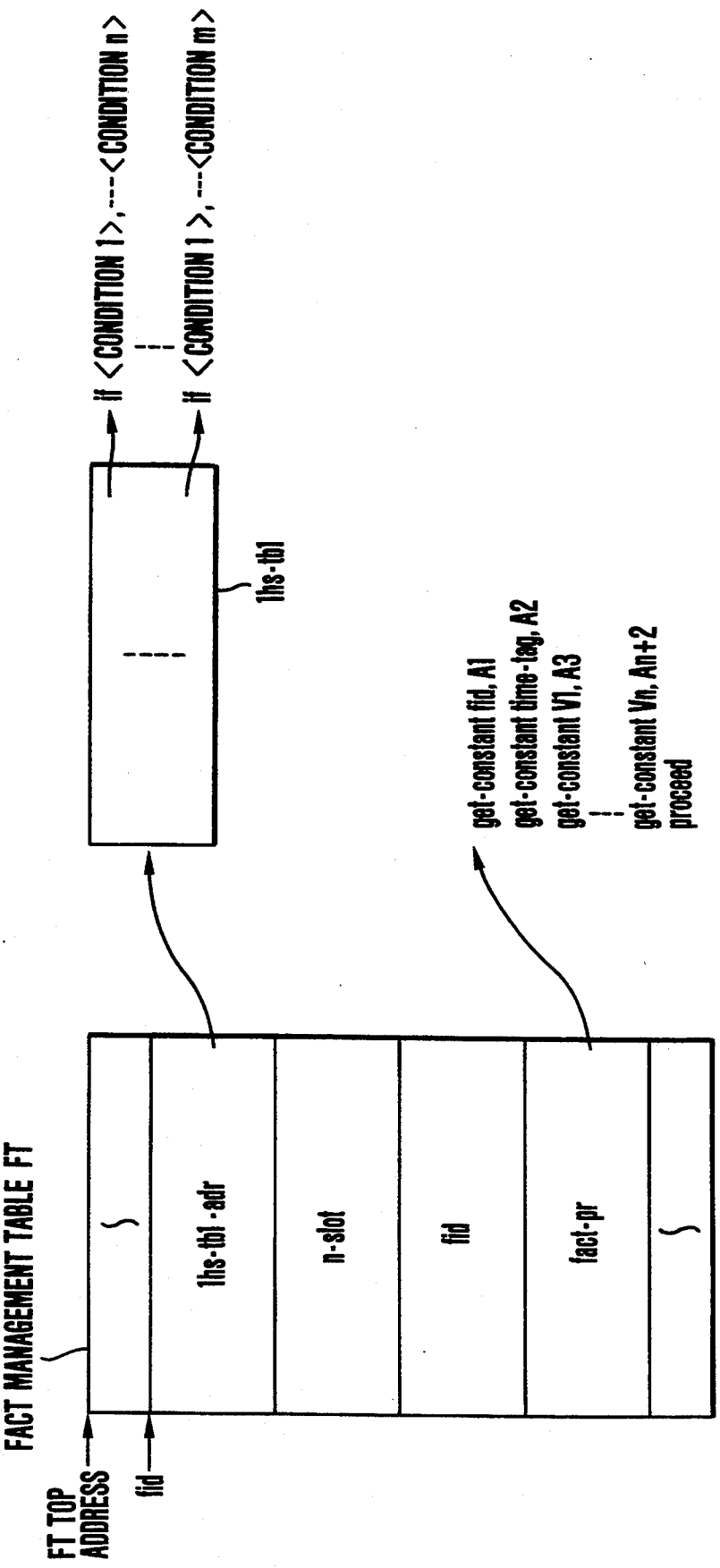
FIG.11 STRUCTURE OF FACT MANAGEMENT TABLE

FIG.12

CONVERSION OF CONDITION PART OF RULE TO MACHINE LANGUAGE INSTRUCTION SET if ( <CONDITION 1>, ------ , <CONDITION n> )   (A12)
           then

```
allocate ℓ
get-constant  fid, A1
get-variable  T-tag, A2       } (B12)
get-variable  V1, A3
   ⋮
get-variable  Vm, Am+1

<CONDITION 1> INSTRUCTION SET
   ⋮                              } (C12)
<CONDITION n> INSTRUCTION SET move H, SH                    } (D12)
move K, H put-list A1
unify-value VV1
   ⋮                              } (E12)
unify-value VVp put-list A2
unify-value T-tag 1           } (F12)
   ⋮
unify-value T-tagq add-cs rid                    } (G12)

move H, K
move SH, H                    } (H12)
deallocate
fail
```

INFERENCE PROCESSING METHOD AND APPARATUS

This application is a continuation of application Ser. No. 07/935,340, filed on Aug. 27, 1992, now abandoned, which is a continuation of application Ser. No. 824,916, filed Jan 22, 1992, now abandoned, which is a continuation of application Ser. No. 07/320,611, filed on Mar. 8, 1989, which is now abandoned.

BACKGROUND OF THE INVENTION

The present invention relates to a method and system for high speed processing of an expert system, and more particularly to a method and system for inference processing for translating rules and facts to an instruction sequence of a computer machine language to realize high speed inference.

"An Abstract PROLOG Instruction Set" by D. H. D. Warren, SRI International Technical Note, No. 309, 1983, pp 1-30 teaches an instruction-set which is useful in implementing software and hardware by effectively utilizing pattern matching function and backtrack function of the logical language PROLOG for constructing a high speed inference engine of an expert system by using the pattern matching function of the logical language PROLOG. In the prior art, a function of "Getting instantiation comprising a combination of executable rules and facts which meet the conditions thereof to generate a conflict set" which is an essential function of the inference engine cannot be attained in an efficient manner. The PROLOG basically determines only one executable rule by the pattern matching function which is called unification for setting a value to a variable and the backtrack function for automatically backtracking to select another rule. Accordingly, it is essentially not suitable to "getting all executable rules" which is the essential function of the inference engine. In the prior art, the instantiation set is realized by fact statements of the PROLOG. It is necessary to add a fact statement by using a built in predicate "assert" of the PROLOG in the execution stage of the inference, and delete a fact statement by using a built in predicate "retract". As a result, high speed processing is difficult to attain.

SUMMARY OF THE INVENTION

It is an object of the present invention to significantly improve an inference speed of an expert system by processing a process of getting all instantiation sets which constitutes the heaviest workload in the inference, at a high speed.

It is another object of the present invention to provide a knowledge processing tool which performs, at a high speed, the function of "getting all executable rules to generate instantiation" which is the fundamental function of the inference tool for forward reasoning, and a function of "deleting instantiation whose attribute has a fact as an element in the execution stage of the rule".

It is an other object of the present invention to provide a knowledge processing tool which permits high speed pattern matching with a fact, gets all instantiation for the condition of the rule at a high speed, and sequentially examines conditions of other rules while backtracking the conditions of the rules.

It is an other object of the present invention to provide a compile type knowledge processing tool which is faster than a prior art inference engine which interprets the rules.

The above objects are achieved by providing, in a storage, a storage area for holding an instantiation used for generating the instantiation set at a high speed and maintaining the content even if the backtrack occurs. Also provided are means for generating an instantiation of a rule which meets a condition of the rule in the instantiation holding area, wherein the instantiation is generated the form of data structure rather than a fact statement which comprises an attribute and a value, and means for deleting from the instantiation set the instantiation whose attribute contains updated facts as an element in the execution stage of the rule to eliminate the need of the translation to a machine language instruction.

The means for generating the instantiation in the instantiation holding area is attained by transferring the execution function of the inference engine from a work area which includes a work environment used in the execution of the program to the instantiation holding area immediately after the condition of the rule has been met.

Thus, even if the backtrack is forcedly effected, the instantiation can be sequentially obtained because the instantiation is generated in the instantiation holding area which is not affected by the backtrack.

On the other hand, the instantiation whose attribute contains the updated fact can be rapidly deleted from the instantiation set obtained by the above means because the instantiation which is not the fact statement but the data need not be translated.

BRIEF DESCRIPTION OF THE DRAWINGS

FIG. 2A-B shows an inference source program prior to translation by the means of the present invention, FIG. 3 illustrates execution thereof, FIGS. 6 to 23 show details of embodiments of the present invention.

DESCRIPTION OF THE PREFERRED EMBODIMENTS

An example of knowledge of rule and fact is shown in FIG. 2, and an execution process therefore is illustrated in FIG. 3.

FIG. 2A shows an example of rule knowledge. It is a rule which represents that if there is a fact X that an attribute "value" is "human being", the attribute "value" of the fact X is to be changed/modified to "die". FIG. 2B shows an example of fact knowledge. It means that Socrates has "human being" as an attribute "value".

As shown in FIG. 3, assuming that the execution process of the inference engine for the present example is of the forward reasoning, whether a fact 1(c) meets a condition (D1) of a rule or not is examined, and if it does, an instantiation comprising the rule 1, the fact 1 and a variable X (rule 1, fact 1, X=Socrates) is stored into the instantiation holding area. In the present example, since there is no other instantiation and the rule 1 in the above instantiation is the only executable rule, the execution process for the next rule follows (D2) so that the attribute "value" of Socrates which is the fact represented by the variable X is changed to "die". As a result, a new fact (E) (Fact 2: Socrates value=die) is prepared. Then, the instantiation which has the pre-change fact 1 is deleted from the instantiation holding area. As a result, no instantiation exists in the instantiation holding area. The new fact 2 is examined to determine whether it meets the condition (D1) of the rule. Since it does not meet, all rules are not met, and no instantiation exists in the instantiation holding area. Thus, the process is terminated. In this manner, only the fact 2 is FIG. 3 is obtained in the forward reasoning.

In general, there are a plurality of rules and facts and the instantiations increases explosively. In such a forward reasoning, high speed processing for getting all instantiations is important.

Figure 4:
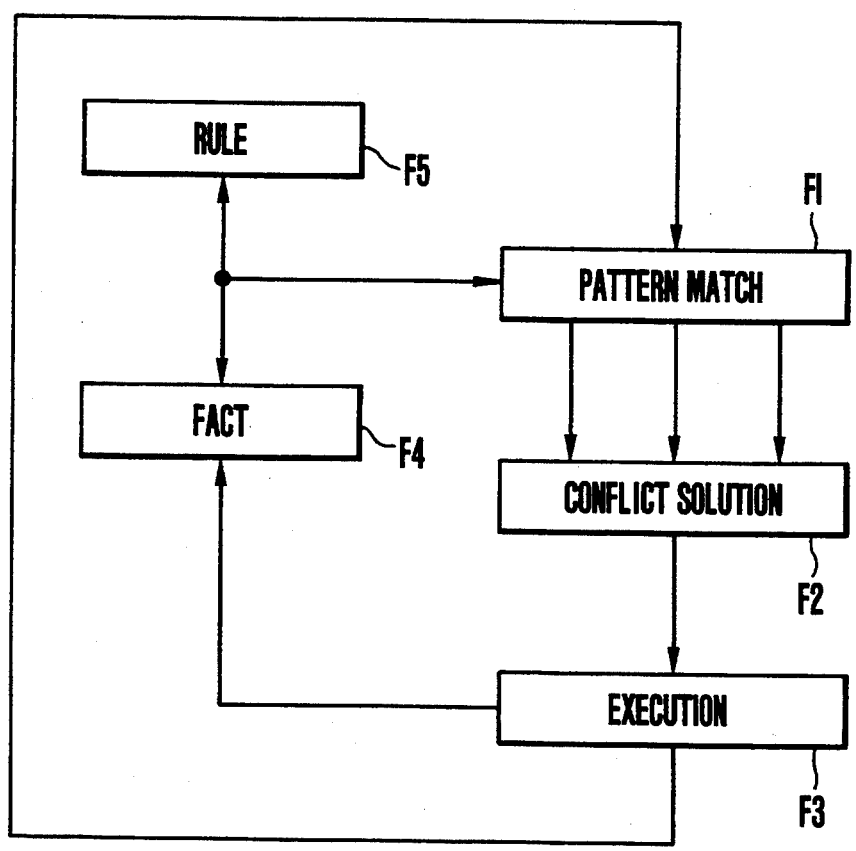
FIG. 4 shows a general inference mechanism.

FIG. 4 shows a mechanism for executing the forward reasoning of the inference engine. F1 pattern-matches a rule F1 with a fact F4, gets all instantiations which meet the condition of the rule F5 and adds them to the conflict set. In a conflict solving process F2, only one rule is selected based on a certain strategy. For example, it preferentially selects a rule which is met by a latest fact, or preferentially selects a rule having a largest number of conditions. In F3, an execution portion of the selected rule is executed, the fact is updated, a new fact is generated or the fact is deleted, the instantiation which met the condition under the pre-change fact is deleted from the conflict set, and all rules which are met under the updated or added fact are got by the pattern matching F1.

The inference engine repeatedly executes until the conflict set becomes empty.

Figure 5:
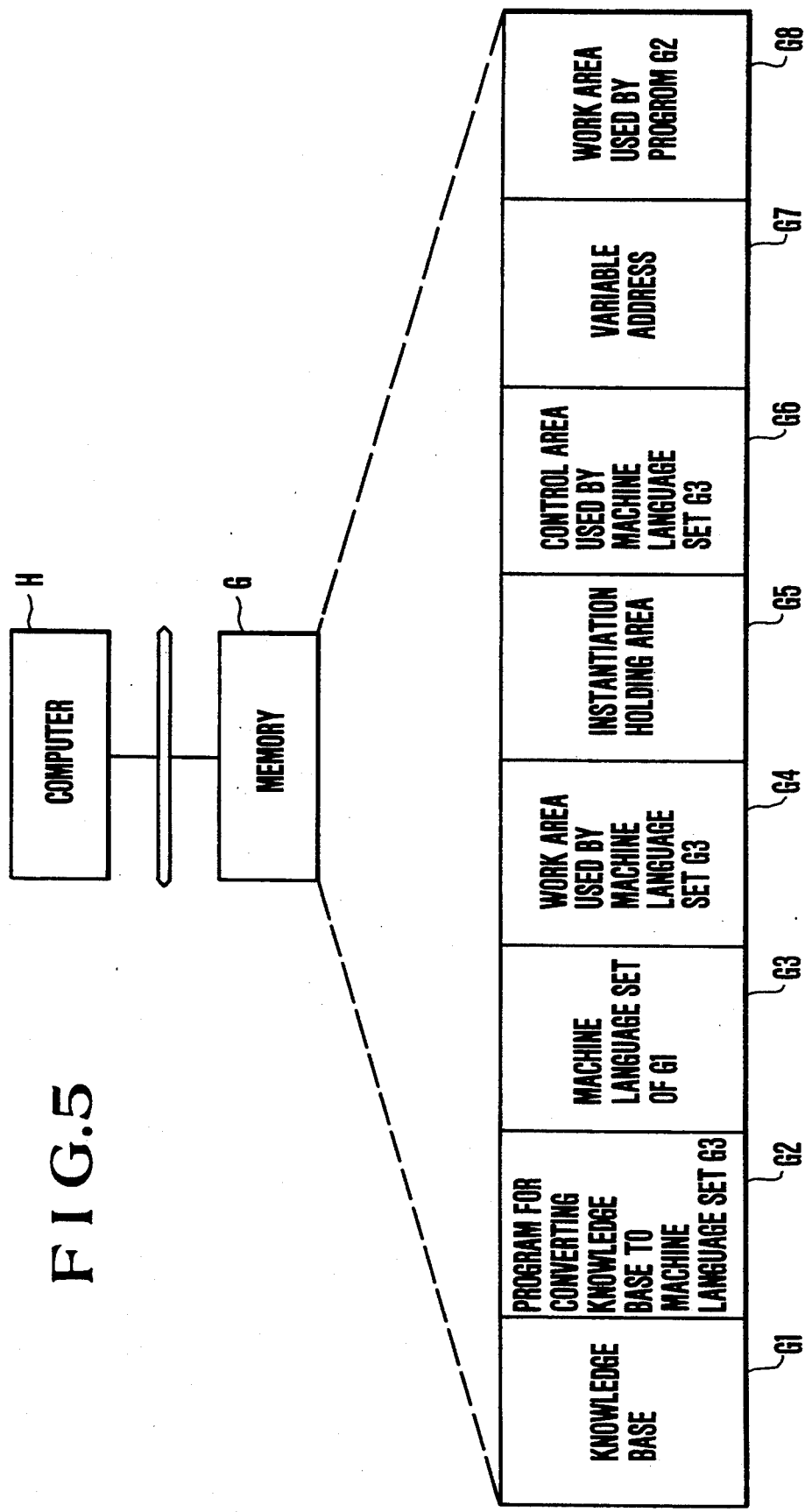
FIG. 5 shows the computer and memory necessary to attain the present invention.

FIG. 5 shows a hardware configuration for attaining one embodiment of the present invention. H denotes a computer for executing a program stored in a memory G. An instruction set thereof contains at least machine language instructions described in the above cited reference. G denotes a memory, G1 denotes a memory area for storing a knowledge base comprising rules and facts shown in FIG. 1, G2 denotes a memory area for storing a program for realizing the means of the present invention, G3 denotes a memory area for storing a machine language instruction set converted from the knowledge base G1 by the program G2, and G4 denotes a work area used when the machine language instruction set G3 is executed. Work area G4 corresponds to an area called Heap in the above cited reference. G5 denotes an instantiation holding area newly provided to realize the means of the present invention, and G6 denotes a control area used by the machine language instruction set and it corresponds to an area called Stack in the above cited reference, G7 denotes a memory area for storing an address of a variable in order to restore the original value of the variable when backtrack occurs, and it corresponds to an area called Trail Stack in the above cited reference. G8 denotes a work area used by the conversion program G2.

FIG. 6 shows an overall structure of a program for realizing the means of the present invention. I1 denotes a program for converting the knowledge fact of FIG. 2B to a machine language instruction set, I2 denotes a program for converting a condition portion of a rule to a machine language instruction set, I3 denotes a program for converting an execution portion of the rule to a machine language instruction set, and I4 denotes a processing program for preparing a fact management table.

FIG. 7 shows in detail the program I2. I20 denotes a main portion of the program for converting the condition portion of the rule to the machine language instruction set, and I21 denotes a machine language instruction set generation program having a function to generate an instantiation, which is an important means in the present embodiment.

Figure 8:
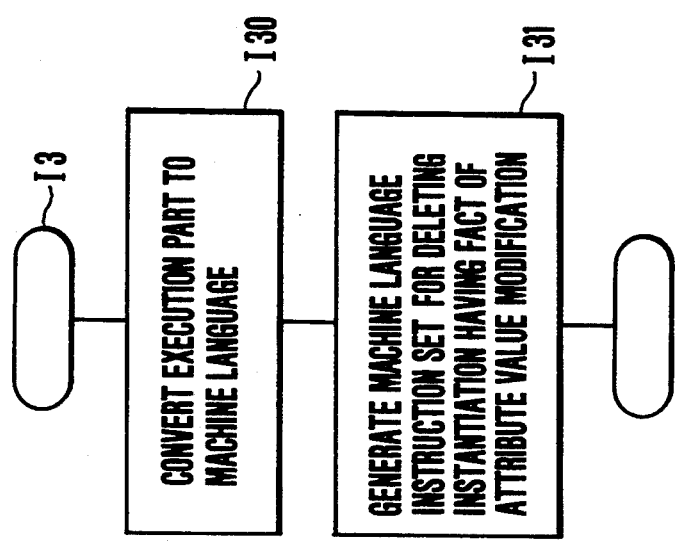

FIG. 8 shows in detail the program I3. I30 denotes a program for converting the execution portion of the rule to the machine language instruction set, and I31 denotes a program for generating a machine language instruction set by deleting all instantiations having facts whose attributes have been updated by the execution of the machine language instruction set generated by I30, from the instantiation holding area.

Figure 9:

The respective programs are described in further detail. FIG. 9 shows general expression of the fact knowledge. In the present invention, the pattern match process F1 of FIG. 4 is speeded up by converting the fact knowledge of FIG. 9(J) to instruction sets "get-constant fid, A1", "get-constant time-tag, A2" and "get-constant Vi, Ai+2" (i=1~n) and an instruction set "proceed" described in the above cited reference.

Figure 10:
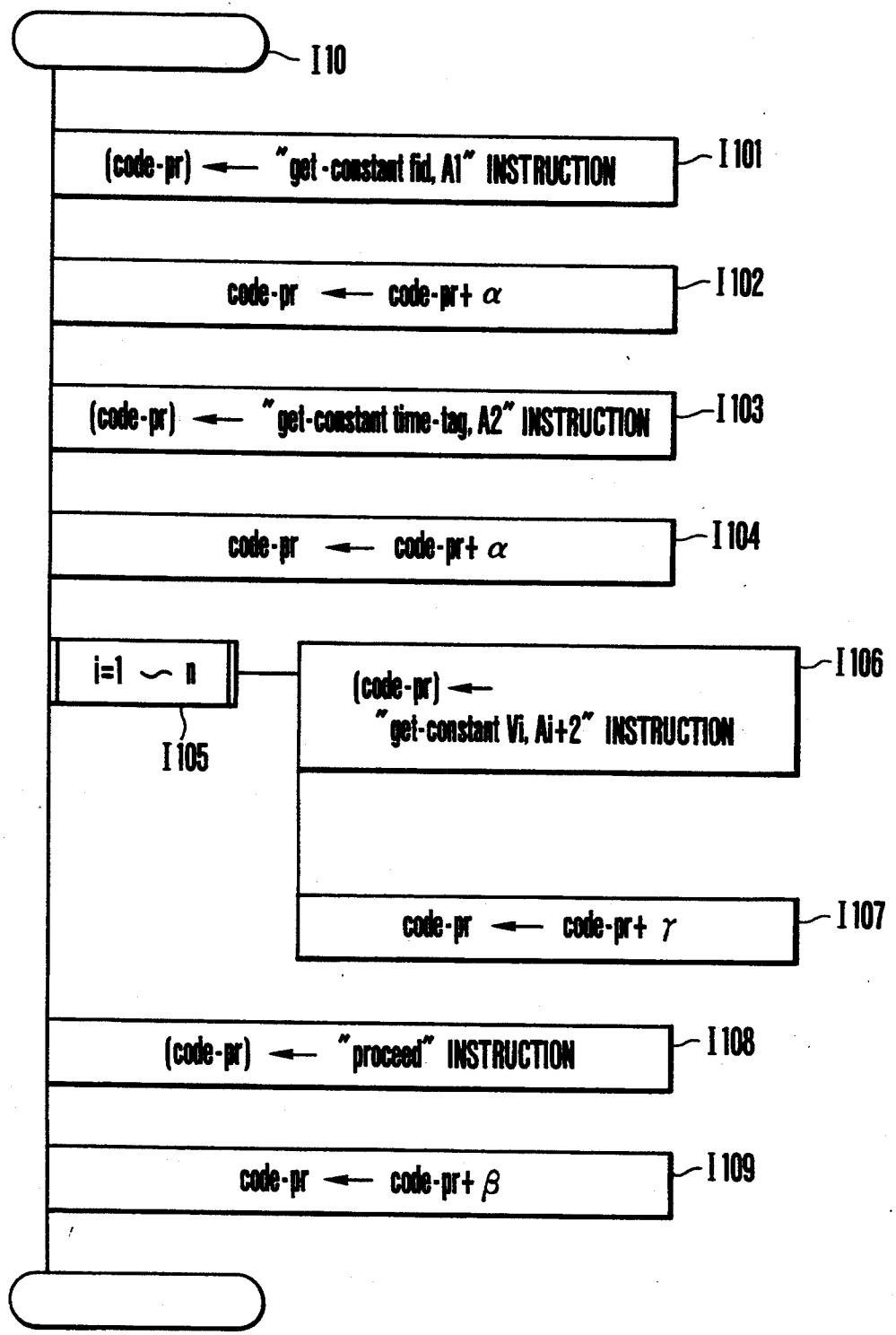

The "get-constant" instruction instructs pattern matching between a constant and an argument register Ai (Argument Register in the above reference). "fid" is an identification number for uniquely identifying the fact, and "time-tag" is a time flag for representing the newness of the fact The larger is the value of the "time-tag", the newer is the fact. Vi (i=1~n) is the attribute of the fact, and the "proceed" instruction is executed only when the pattern matching by the "get-constant" instruction success. In the above reference, it is an instruction to jump to the address pointed by the register CP (continuous pointer). The program I10 of FIG. 10 is the process I1 and shows means for converting FIG. 10(J) to the machine language instruction set of FIG. 10(K) and storing it into the memory area G3 of FIG. 5. In I101, the "get-constant fid, A1" instruction is written into a memory location designated by Code-Pr which indicates a top address of G3. In I102, Code-Pr is incremented by a size α of the instruction. In I103, the "get-constant time-tag, A2" instruction is written into the memory location designated by Code-Pr. In I104, Code-Pr is incremented by the size α of the instruction. In I105, the steps I106 and I107 are executed n times, where n is the number of attributes of the fact. In I106, the "get-constant Vi, Ai+2" instruction is written into the address designated by Code-Pr. In I107, Code-Pr is incremented by a size γ of the instruction. In I108, the "proceed" instruction is written into the memory location designated by Code-Pr. In I109, Code-Pr is incremented by a size β of the "proceed" instruction.

FIG. 11 shows a fact management table prepared in I4 of FIG. 6. The fact is not only referred in the pattern matching process F1 of FIG. 4 but also the attribute of the fact is updated in F3. The fact management table is used to rapidly update the attribute in F3 and rapidly check a possibility of execution of a rule whose fact is referenced by the condition part in F1.

The fact management table FT shown in FIG. 11 comprises a pointer lhs-tbl-adr to a table lhs-tbl which contains facts and address of machine language instructions whose condition parts of the rules referred to by the condition parts have been converted in I2, the number of attributes n-slot of the facts, the fid information for uniquely determining the fact, and the fact-Pr to the machine language instruction set corresponding to the fact.

The condition portion processing program for the rule of FIG. 7 is explained in detail. I20 denotes a program for converting the condition portion to the machine language instruction set, and I21 denotes a program for generating the machine language instruction set having the function to generate the instantiation, which is the most important means in the present invention. Prior to the explanation of the program, the conversion of the condition portion of the rule to the machine language instruction set is explained with reference to FIG. 12.

A12 denotes a condition portion of a rule comprising n conditions. In general, each of the conditions refers the attribute of the fact and is conditions by a relationship among the attributes of the facts. Each attribute may include a variable as the condition of the rule of FIG. 2A does. In the means of the present invention, the condition part of the rule is converted to as many machine language instruction sets shown in FIG. 12 as the number of facts referred by each condition. For example, if the condition part of A12 refers K facts, K machine language instruction sets of FIG. 12 are prepared. Machine language instruction sets B12~H12 are instruction sets executed when the fact (J) is referred by the condition part of A12. The function of the machine language instruction set is briefly explained.

As described in detail in the above cited reference, the machine language instruction "allocate" secures l areas in the control area G6 of FIG. 5, where l is the number of variables included in the condition portion of A12, and secures an area for and stores the control information. In B12, the attribute of the updated fact and the time tag is held in the variable areas Vi (i=1~m) and T-tag, respectively. "fid" is used to examine whether the identification of the updated fact is "fid" or not. The "get-constant" instruction and the "get-variable" instruction are described in the above cited reference. C12 denotes a machine language instruction set corresponding to the condition portion of A12 and it corresponds to the substitution of the attribute for the variable and the comparison of the substituted value with other attribute. D12 denotes a machine language instruction set which plays an important role in the present invention. In B12·C12, the processing is done by using the work area G4 and the control area G6 while D12 comprises a "move H, SH" instruction to transfer the content of the register H (FIG. 12) which represents the top address of G4 to the temporary hold register SH and a "move K, H" instruction to transfer the content of the register K which represents the top address of the instantiation holding area to the register H. This means that the instantiation generated in E12~F12 is generated in the instantiation holding area G5 rather than the work area G4. A "put-list" instruction and a "unify-value" instruction used in E12 and F12 in the above reference by D. H. D. Warren are generated in a memory location designated by the list data designated by an operand of each instruction, a variable and the register H. However, according to the invention, as shown in D12, the register H is altered to designate the top address of the instantiation holding area so that the instantiation is generated in the instantiation holding area G5 by the above instruction.

Figure 13:
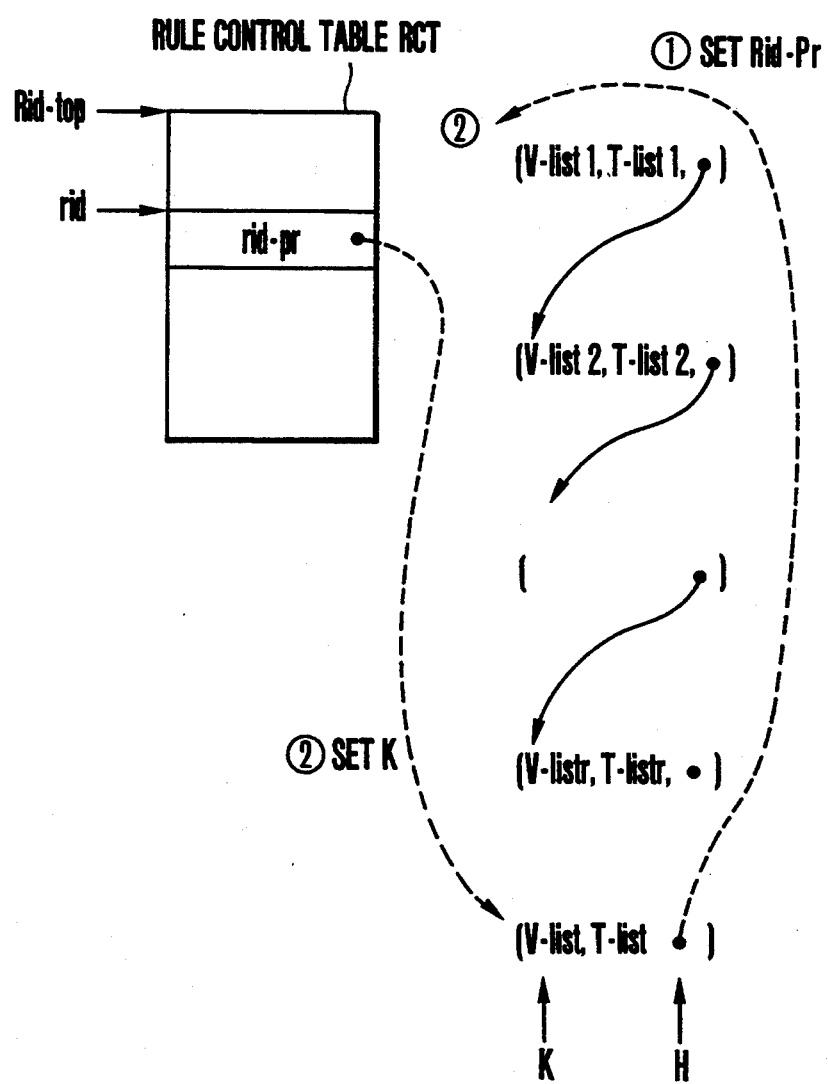

E12 comprises a "put-list" instruction for writing a list pointer which points the top address of the instantiation holding area G5 into the register A1 (FIG. 12), and a "unify-value" instruction for writing a variable VVi (i=1~p) into the instantiation holding area. In this manner, the variable information which is a portion of the instantiation information is written into the instantiation holding area. F12 comprises a "put-list" instruction for writing a pointer which points the top address of the instantiation holding area G5 into the register A2, and a "unify-value" instruction for writing a time-tag (T-tag) (i=1~q) of the fact which meets the condition of C12 into the instantiation holding area. In this manner, the time tag information which is a portion of the instantiation may be written into the instantiation holding area. In G12, since the generation of the instantiation into the instantiation holding area has been completed, an "add-cs" instruction for registering the generated variable information list V-list and time tag list T-list into a rule control table RCT as shown in FIG. 13 is executed. The expression rid denotes a number for uniquely determining the rule.

Figure 14:
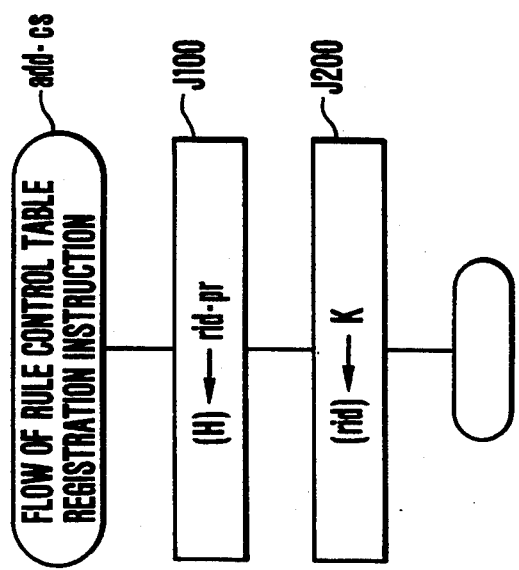

The V-list (i=1~r) and the T-list (i=1~r) of FIG. 13 represent the instantiation list registered in the rid entry of the RCT. The newly generated instantiations V-list and T-list are processed by an "add-cs" instruction so that ① rid-pr which is a content of the rid entry of the RCT is written into a pointer cell (a location designated by the register H) of the newly added instantiation and then ② rid-pr is written into the register K. In this manner, the new instantiation can be registered into the rule control table and the entry of rid. This process is shown in a process flow of the add-cs instruction shown in FIG. 14. In H12 of FIG. 12, the register H is restored from the instantiation holding area to a work area. The content of the register H is transferred to the register K and the content of the next register SH is transferred to the register H so that in the subsequent process, the register H controls the work area. The "deallocate" and "fail" instructions release the control information and the variable areas from the control area and cause the backtrack to occur, as described in the above cited reference. Thus, the instantiation may be stored into the instantiation holding area which is not affected by the backtrack (that is, which is not released by the backtrack). On the other hand, the condition parts of different rules may be successively executed by forcedly generating the back-track. Thus, all instantiations can be efficiently stored into the instantiation holding area. In the present invention, as shown in D12 and G12, the work area and the instantiation holding area can be switched in a simple process, and as shown in E12 and F12, the instantiation may be generated in the work area and then another instantiation may be directly generated in the instantiation holding area without copying the first instantiation into the instantiation area. The newly generated instantiation can be registered into the rule control table by J100 and J200 as shown in FIG. 14 by using the registers K and H.

The process of I20 and I21 of FIG. 7 have thus been described. In I20, the condition part of the rule is converted to the machine language set B12~C12 of FIG. 12, and in I21, it is converted to the machine language instruction set D12~H12 of FIG. 12.

In this manner, the rule having the updated fact as the referred condition can be executed, and all instantiations can be efficiently held in the instantiation holding area. Thus, the pattern match process F1 of FIG. 4 is completed. It is then necessary to determine one rule to be executed by a conflict solving process F2. This process is not directly connected to the present invention, and it is now assumed that a rid number which uniquely specifies a rule and instantiations thereof ((VV1 ..., VVp), T-list) are selected from the instantiation holding area. When there is no longer instantiation in the instantiation holding area, all inference processes are over.

Figure 15:
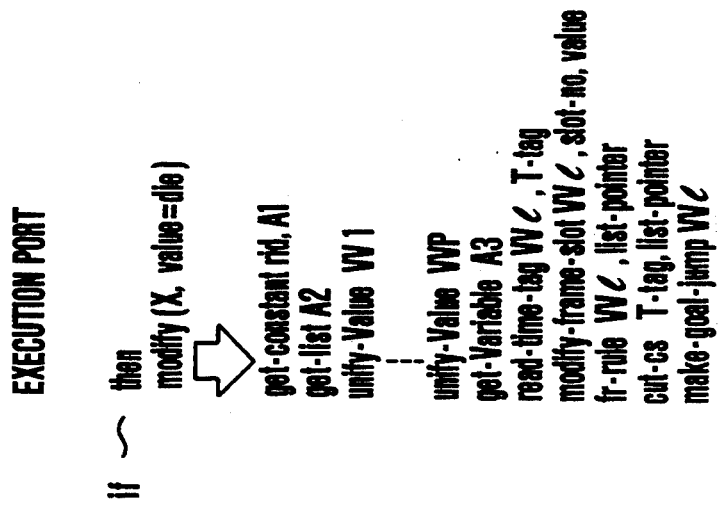

The process of the execution part of the rule shown in FIG. 8 is now explained in detail. The manner of converting the execution part of the rule into a machine language instruction set is first explained with reference to FIG. 15. In FIG. 15, the execution part of the rule is "modify (X, value−die)". It is a process to modify the attribute "value" of the fact X to "die". A "get-constant rid, A1" instruction instructs to pattern-match the argument register A1 which also holds the rule number with the rule number rid. Only when the rule to be executed is rid, it is executed.

A "get-list, unify-value VV1, ..., unify-value VVp" instruction instructs to refer the variable information VV1, ..., VVp in the instantiation. The variable which appears in the condition part of the rule as the variable and which also appears in the execution part is stored in the instantiation holding area in order to allow the reference by the execution part. In the present example, it is assumed that VV1 ($1 \leq \xi 1 \leq P$) represents the variable which holds fid of the modified fact. A "get-variable A3" instruction instructs to obtain the time tag information in the instantiation. In the present example, it is merely held in the argument register A3 because of no need. A "read-time-tag VV1, T-tag" instruction instructs to store the time tag of the modified fact into the variable T-tag. It will be explained in detail with reference to FIG. 16. A "modify-frame-slot" instruction instructs to modify the attribute slot-no of the modified fact VV1 to value and update the time tag thereof. A "fr-rule VV1, list-pointer" instruction instructs to determine a rule which refers the modified fact by the condition part thereof from the rule frame table and store the list data into the variable list-pointer. Thus, by executing only the rule which is in the list-pointer, all rules which are met under the modified fact are obtained. A "cut-cs" instruction instructs to examine whether the instantiation in the instantiation holding area has the time tag T-tag which indicates the unmodified fact. In this instruction, all instantiations which have T-tags in the instantiation holding area are deleted. A "make-goal-jump" instruction instructs to load the arguments of the modified fact VV1, that is, the attribute values into the argument register A1, and successively execute the machine language instruction set for the condition part of the rule which refers the fact. In this manner, the pattern match process of the condition part of the rule is called. In the present invention, the instantiation information is efficiently obtained by the compile system.

Figure 16:
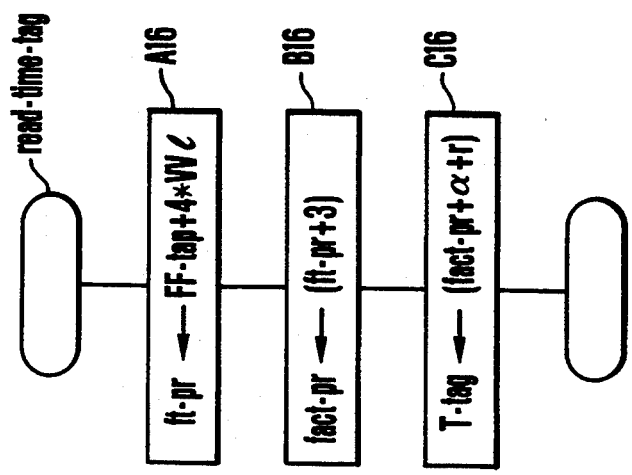

The "read-time-tag" instruction is now explained with reference to FIG. 16. In A16, ft-pr is determined base on FT-top which indicates the top address of the fact control table of FIG. 11 and VV1 which indicates fid of the fact. The ft-pr is the top address of the four information lhs-tbl-adr, n-slot, fid, fact-pr shown in FIG. 11. In B16, a content of the table having ft-pr plus 3, that is, the address which designates the machine language instruction set of the fact is substituted for fact-pt. In C16, in order to load the value of time-tag in FIG. 11 to T-tag, the content of the address fact-pr+$\alpha$+$\gamma$ (where $\alpha$ is a size of the instruction and $\gamma$ is an operand size) is loaded to T-tag. Thus, the time tag is loaded into the variable T-tag.

Figure 17:
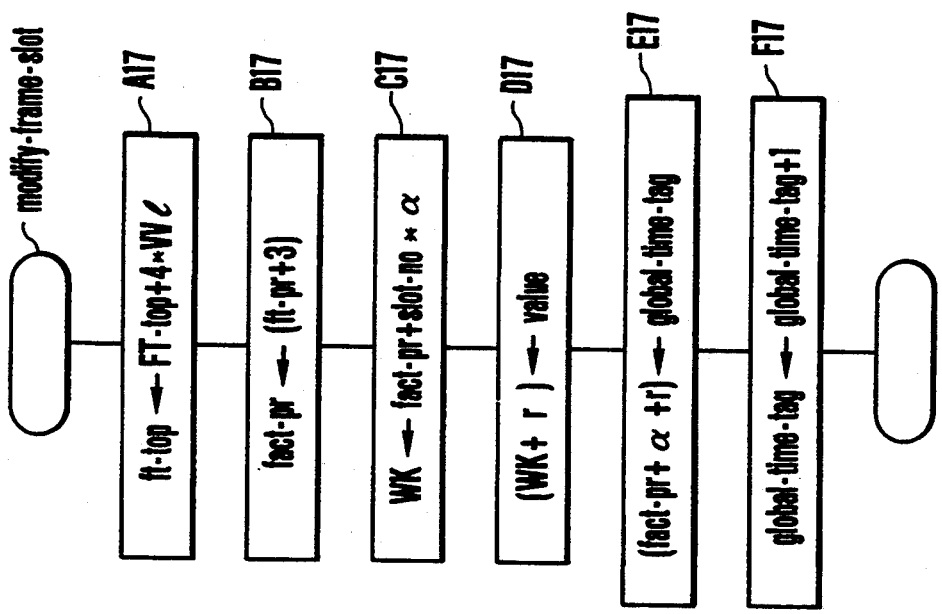

FIG. 17 shows a flow of the "modify-frame-slot" instruction. In A17, the information area address ft-top for fid of the fact control table is determined based on FT-top and VV1. In B17, the address fact-pr to the machine language instruction set of the fact is determined. In C17, the top address wk of the machine language instruction having the attribute to be modified is determined based on the attribute number slot-no and the instruction size $\alpha$. In D17, the operand of the machine language instruction, that is, the value which is to be changed to the attribute value is written. In E17, since the fact has been modified, the content of global-time-tag which holds the latest time tag is written into the address fact-pr+$\alpha$+$\gamma$ of the time tag in the machine language instruction set in order to update the time tag. In F17, the value of global-time-tag is updated in preparation for the next updating of the fact.

Figure 19:
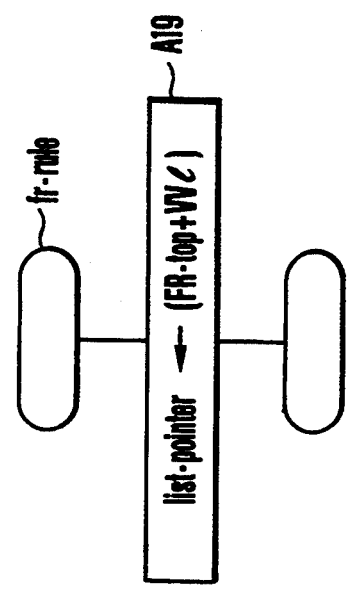
Figure 18:
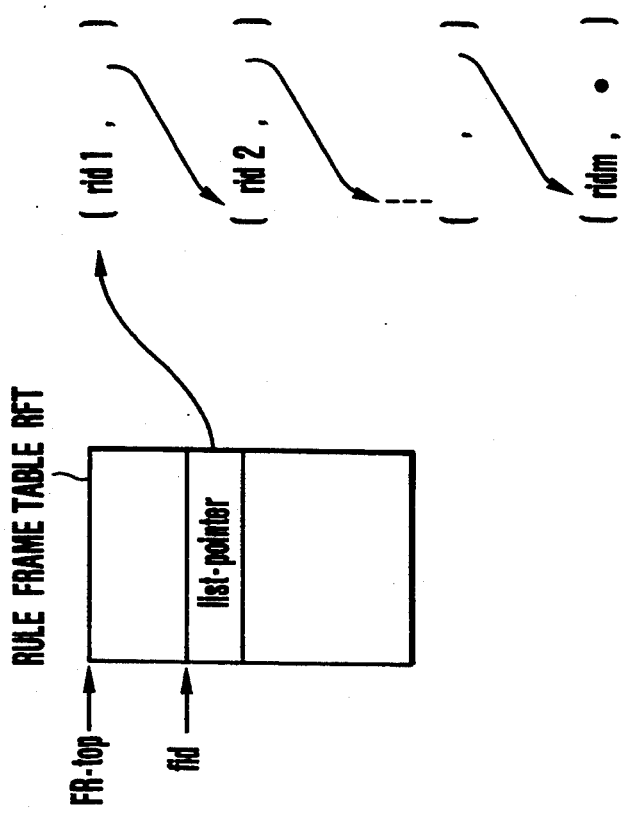

The "fr-rule" instruction is now explained. First, a structure of the rule frame table which holds the rule whose fact is referred by the condition part of the rule is explained. FIG. 18 shows a roof frame table RFT, a FR-top which indicates the top address thereof, and a list pointer which points the list of the rules which refer the facts fid. The rules referred are coupled by the numbers rid 1~rid m which uniquely specify the rules. In the present example, it represents that the fact fid appears in m rule condition parts rid 1~rid m. The "fr-rule" instruction is now explained with reference to FIG. 19.

In A19, based on the top address FR-top of the rule frame table and VV1 which represents the fact fid, the list address of the rule which refers the fact thereof by the condition part is loaded into the list pointer.

Figure 20:
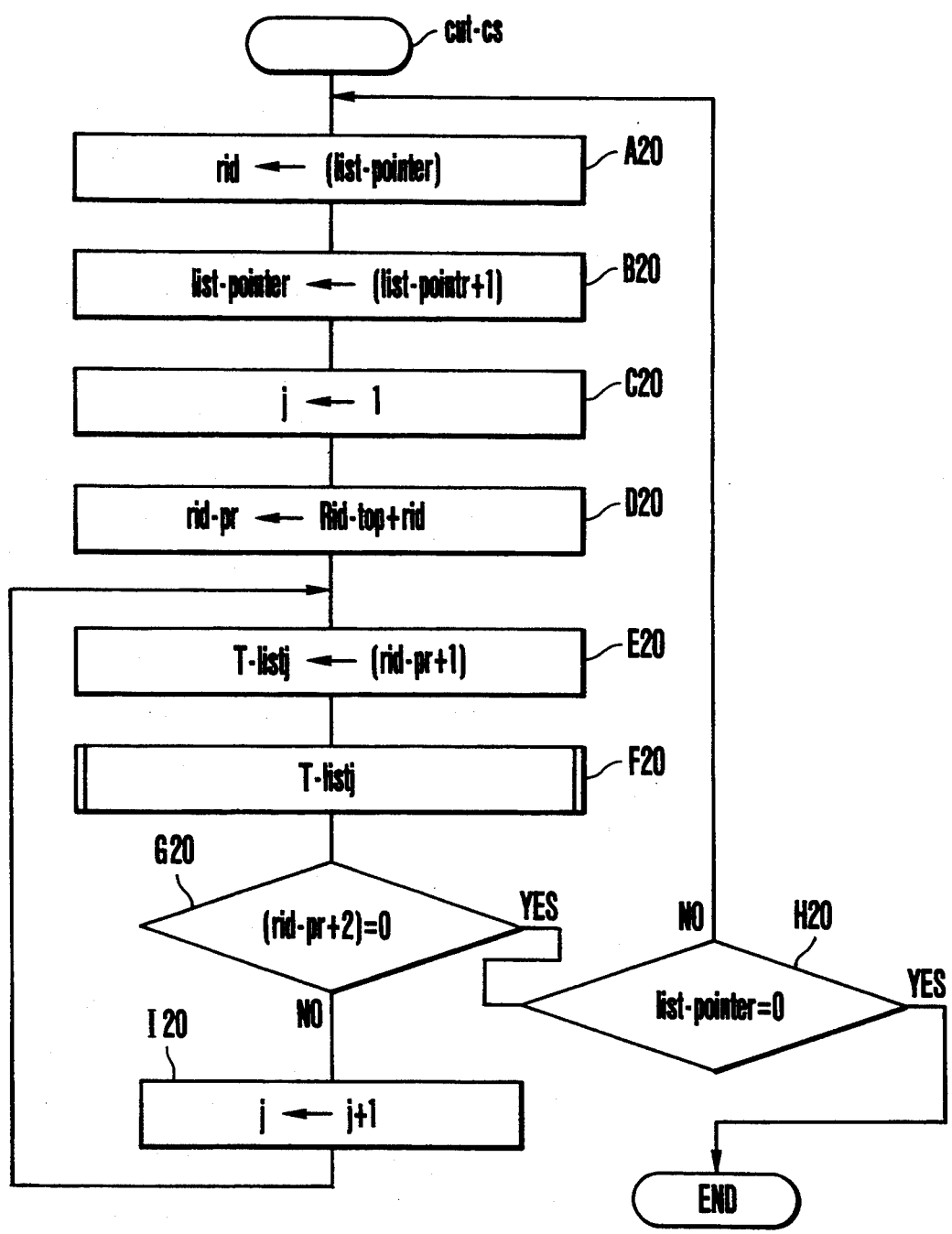

The flow of the "cut-cs" instruction is explained with reference to FIG. 20. In A20, a rule rid which is the content of the list pointer is determined. In B20, the address of the next rule is held into the list pointer. In C20, whether the instantiation which has the time tag T-tag of the modified fact VV1 is present in the instantiations converted to the rid entry in the instantiation holding area of FIG. 13 is examined. The time tag lists T-list j (j=1~r) of the instantiations are completely examined. In C20, j is substituted by 1 as an initial value of the j-th time tag list T-list j. In D20, in order to address the first instantiation, the address is loaded to the value rid-pr.

In E20, the time tag list at the next address to the rid-pr is loaded into T-list j. In F20, if there is T-tag in the T-list j, it is erased, and if there is no T-tag, nothing is done. In G20, whether the content at the address rid-pr+2 is zero or not is examined.

Figure 21:
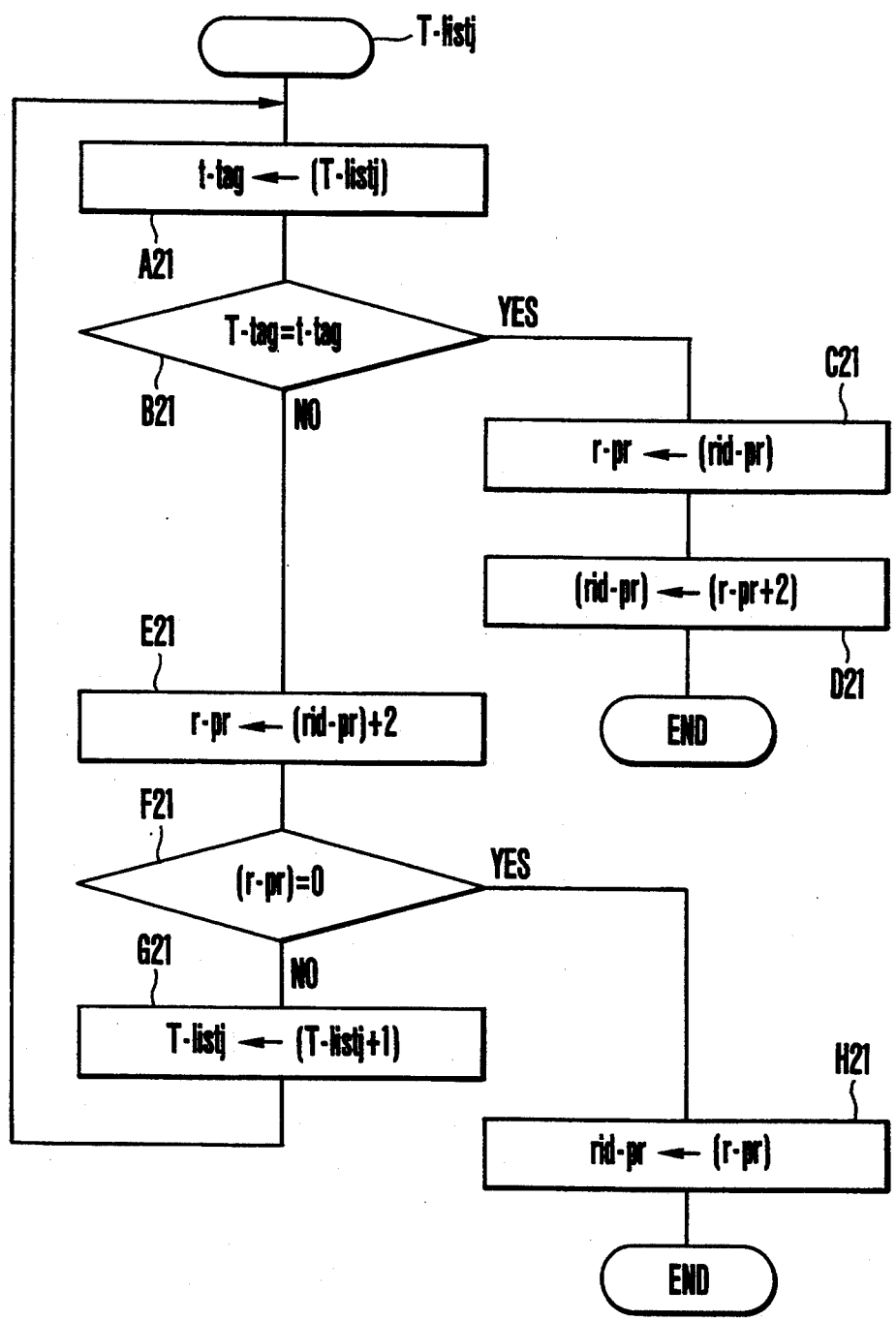

If there is no T-tag as a result of examination of one instantiation connected to rid-pr, whether it is the last instantiation in rid or not is checked in order to hold the address of the next instantiation connected to the same rid, in the process of T-list j. If the decision is yes, whether the last rid has been reached or not is checked because whether the T-tag is present in the instantiation in the other rid is to be checked. If the list pointer is zero, it means that all rids have been processed. In I20, j is added in order to examine another instantiation under the same rid and the step E20 is executed again. If the decision in H20 is no, the instantiation in the other rid is examined. FIG. 21 shows a flow of the T-list process (F20) in FIG. 20. In A21, the content of T-list j, that is, the time tag which represents the address of the time tag list in one instantiation is loaded into the t-tag. In B21, t-tag and T-tag are compared, and if they are equal, the entire instantiation must be deleted from the instantiation list of rid. To this end, the content pointed by rid-Pr which holds the top address of the instantiation to be deleted is loaded into the variable r-Pr (C21). This means that rid-Pr holds the address of the list pointer of the instantiation which is one before the instantiation to be deleted. In D21, in order to delete the content of the list pointer in the instantiation to be deleted, the address of the instantiation which is one after is written into the list pointer cell in the instantiation which is one before. In this manner, the instantiation is removed from the list.

In E21, in order to examined the time tag t-tag of the next instantiation, the list pointer address in the existing instantiation which is equal to the sum of the content of rid-Pr and "2" is loaded to γ-Pr. In F21, whether the content of γ-Pr is zero or not is checked in order to determine whether the time tag list in one instantiation have been wholly examined or not. If the decision is yes, it means that the instantiation does not refer T-tag, and in H21, the content of γ-Pr is loaded to rid-Pr in order to examine the next instantiation. In G21, since it means that the time tag list in one instantiation has not fully examined, the list pointer (T-list j+1) to the next time tag is loaded into T-list j, and the step A21 is repeated.

Figure 22:
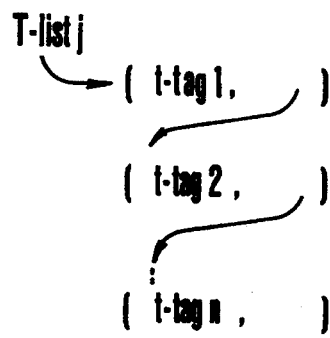

The T-list j process is thus over. For a reference purpose, a structure of the list of T-list j is shown in FIG. 22. T-list j itself has also the list structure.

Figure 23:
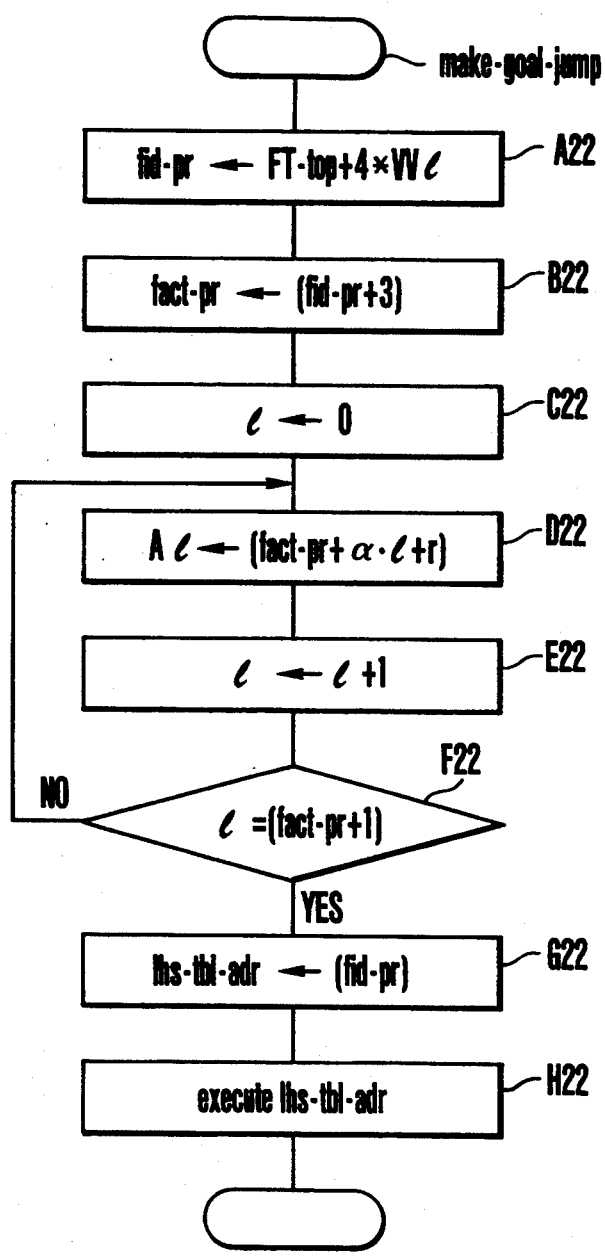

FIG. 23 shows a flow of a "make-goal-jump" instruction which is a machine language instruction for successively executing the instruction codes (FIG. 12) to the condition part of the rule in order to obtain the instantiation under the modified fact.

In A22, the information address fid-Pr of the fact is determined based on the top address FT-top of the fact control table of FIG. 11 and VV1 or fid which indicates the fact. In B22, the machine language instruction set address of the fact is loaded to the variable fact-Pr. In C22, zero is loaded to the variable l in order to load as many attribute values as the number of arguments of the fact, that is, the number of attributes, into the argument register Al (l=1~n−slot). In D22, the operands of the machine language instructions, that is, the attribute values are loaded into the argument register Al, where α is the machine language instruction size and γ is an offset to the operand. In E22, the variable l is incremented. In F22, whether the variable l has been incremented by (fact-Pr+1), that is, (n−slot), is checked. In this manner, all attribute values may be loaded to the argument register Al (l=1~n−slot). If the decision is not, the step D22 is repeated. If the decision is yes, the address of the table which holds the address of the machine language instruction set of the condition part of the rule is loaded into the variable lhs-tbl-adr in G22. In H22, the process branches to the instruction set at the address in the table designated by the operand, by the execute instruction.

Since the first argument register A1 always holds fid, the second argument register A2 hold the time tag of the fact, and the third and following argument registers hold the attribute values of the argument register, matching to the machine language instruction set for the condition part of the rule of FIG. 12 is attained. While not described in detail in the present embodiment, a "try-me-else" instruction and "retry-me-else" instruction which instruct to generate control information in the instruction set and which are described in the above cited reference are generated immediately prior to the machine language instruction codes for the condition parts shown in FIG. 11, and a "trust-me-fail" instruction is generated immediately prior to the machine language instruction sequence for the last condition part. The "fail" instruction added to the end of the converted machine language instruction set and the three control instructions are repeatedly executed together with the execute instruction. As a result, the execute instruction generates all instantiations which meet the condition part of the rule into the instantiation holding area while it successively generates the backtrack.

Figure 1:
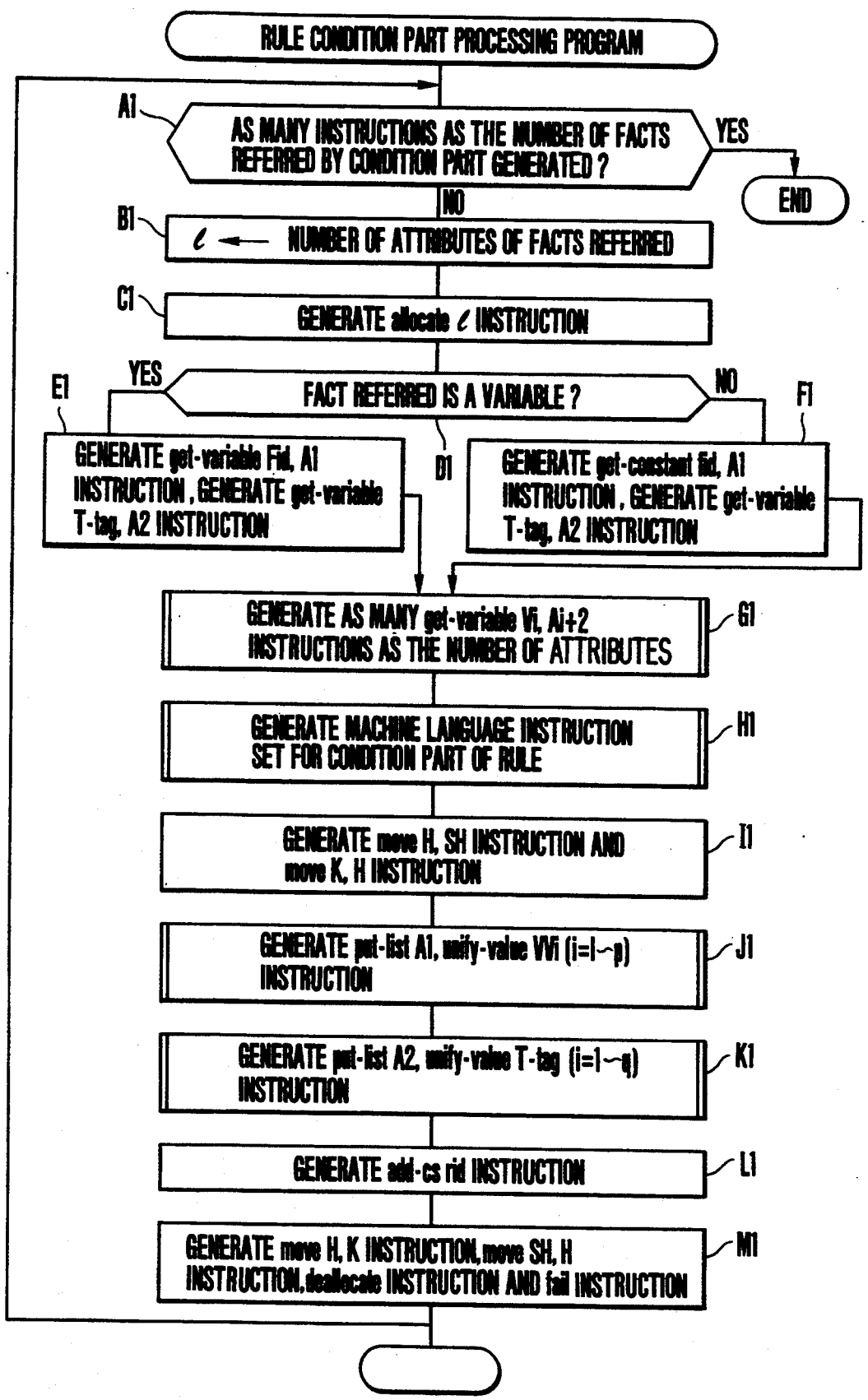
FIG. 1 shows means for generating a machine language instruction set for getting all instantiations in an efficient manner, which is one of the means of the present invention.

Finally, a flow of FIG. 1 which shows means for generating the machine language instruction set of FIG. 12, which is most important in the present embodiment is explained.

In A1, whether as many machine language instructions as the number of facts referred by the condition part of the rule have been generated or not is examined. If they have been generated, the process is terminated. In B1, the number of attributes of the referred facts is substituted for the variable l. In C1, an "allocate l" instruction is generated. In D1, whether the referred facts are represented by variables and whether the fact names are noticed are checked. If they are variables, a "get-variable Fid, A1" instruction and a "get-variable T-tag, A2" instruction are generated, in E1. If they are not variables, a "get-constant fid, A1" instruction and a "get-variable T-tag, A2" instruction are generated in F1 based on the number fid which specifies the fact. In G1, as many "get-variable Vi, Ai+2" instructions (i=1~k) as the number of attributes of the fact are generated. In H1, the machine language instruction set for the condition part of the rule is generated. In I1, the instruction for switching the register H from G4 to G5 of FIG. 5 to switch from the work area to the instantiation holding area is generated. In J1 and K1, the machine language instruction sets for generating the variable information and the time tag information, respectively, in the instantiation holding area is generated. In L1, the instruction for registering the newly generated instantiation to rid is generated. In M1, a "move H, K" instruction and a "move SH, H" instruction are generated to switch from the instantiation holding area to the work area, and a deallocate instruction and a fail instruction which forcedly generates the backtrack are generated. Then, the step A1 is repeatedly executed.

We claim:

1. A method of compiling a knowledge base in an expert system which includes a computer having N registers including registers H, K, SH, and Ai (where i=1 to N−3 and N is an integer);

a knowledge base including fact knowledge and rules, each rule having a condition part for specifying conditions applicable to said each rule and an execution part for specifying execution under application of said each rule, each fact knowledge including M attributes ATi (where i=1 to M and M is an integer) of any values, and said rules including a rule having a condition part for representing an attribute and an execution part for modifying a value of an attribute;

a first memory storage for storing said knowledge base;

a second memory storage for storing said compiler program for compiling said knowledge base into instruction sequences executable by said computer;

a third memory storage for storing said instruction sequences compiled by said compiler program;

an instantiation holding area for storing an instantiation generated by execution of said instruction sequences, said register K denoting a top address of said instantiation holding area;

a first work area used by said compiler program; and a second work area used in execution of said instruction sequences, said register H denoting a top address of said second work area;

said method comprising the steps of:
- (a) compiling fact knowledge having M attributes ATi (i=1 to M) into instruction sequences which transfer each i-th attribute ATi to a corresponding i-th register Ai (i=1 to M);
- (b) compiling an attribute ATi of fact knowledge referred to in a condition part of a rule into instruction sequences including:
  - (b1) a pattern matching instruction sequence which compares the attribute ATi with a content of a corresponding register Ai,
  - (b2) register transferring instructions which transfer a content of said register H to said register SH and a content of said register K to said register H, for adding an instantiation to said instantiation holding area, each instantiation comprising a combination of a rule and a fact knowledge which meets the condition part of said rule,
  - (b3) instructions which generate said instantiation in said instantiation holding area,
  - (b4) instructions which transfer a content of said register H to said register K, and a content of said register SH to said register H, and
  - (b5) a fail instruction which branches to an instruction sequence of another condition part of another rule;
- (c) generating a fact management table comprising at an entry designated by a fact knowledge:
  - (c1) a first address of an instruction sequence of condition parts of rules referring to said fact knowledge, and
  - (c2) a second address of an instruction sequence of said fact knowledge; and
- (d) compiling an execution part of a rule which modifies an attribute ATi of a fact knowledge to instruction sequences including:
  - (d1) a modify instruction which modifies said attribute ATi of said fact knowledge to a value,
  - (d2) a delete instruction which deletes an instantiation containing said fact knowledge with an attribute ATi from said instantiation holding area,
  - (d3) a transfer instruction sequence which transfers each of said attributes ATi of said fact knowledge modified by said instruction (d1) to a corresponding register Ai, said attributes AT1 being included in an instruction addressed by a second address of said fact management table indexed with an entry corresponding to said fact knowledge, and
  - (d4) a jump instruction which branches to an instruction sequence of a condition part of a rule referring to said fact knowledge modified by said instruction (d1), a target address of said jump instruction being included in said first address of said fact management table indexed by an entry corresponding to said fact management table.

2. An apparatus for compiling a knowledge base for an expert system which includes a computer having N registers including registers H, K, SH, and Ai (where i=1 to N−3 and N is an integer);

a knowledge base including fact knowledge and rules, each rule having a condition part for specifying conditions applicable to said each rule and an execution part for specifying execution under application of said each rule, each fact knowledge including M attributes ATi (where i=1 to M and M is an integer) of any values, and said rules including a rule having a condition part for representing an attribute and an execution part for modifying a value of an attribute;

a first memory storage for storing said knowledge base;

a second memory storage for storing said compiler program for compiling knowledge base to instruction sequences executable by said computer;

a third memory storage for storing said instruction sequences compiled by said compiler program;

an instantiation holding area for storing an instantiation generated by execution of said instruction sequences, said register K denoting a top address of said instantiation holding area,;

a first work area used by said compiler program; and a second work area used in execution of said instruction sequences, said register H denoting a top address of said second work area;

said apparatus comprising:
- (a) means for compiling fact knowledge having M attributes ATi (i=1 to M) into instruction sequences which transfer each i-th attribute ATi to a corresponding i-th register Ai (i=1 to M);
- (b) means for compiling an attribute ATi of fact knowledge referred to in a condition part of a rule into instruction sequences including:
  - (b1) a pattern matching instruction sequence which compares the attribute ATi with a content of a corresponding register Ai,
  - (b2) register transferring instructions which transfer a content of said register H to said register SH and a content of said register K to said register H, for adding an instantiation to said instantiation holding area, each instantiation comprising a combination of a rule and a fact knowledge which meets the condition part of said rule,
  - (b3) instructions which generate said instantiation in said instantiation holding area,
  - (b4) instructions which transfer a content of said register H to said register K, and a content of said register SH to said register H, and
  - (b5) a fail instruction which branches to an instruction sequence of another condition part of another rule in said computer;
- (c) means for generating a fact management table comprising:
  - (c1) a first address of an instruction sequence of condition parts of rules referring to said fact knowledge, and
  - (c2) a second address of an instruction sequence of said fact knowledge, generated at an entry designated by a fact knowledge; and (d) means for compiling an execution part of a rule which modifies an attribute ATi of a fact knowledge to instruction sequences including:
  (d1) a modify instruction which modifies said attribute ATi of said fact knowledge to a value,
  (d2) a delete instruction which deletes an instantiation containing said fact knowledge with attribute ATi from said instantiation holding area,
  (d3) a transfer instruction sequence which transfers each of said attributes ATi of said fact knowledge modified by said instruction (d1) to a corresponding register Ai, said attributes ATi being included in an instruction addressed by a second address of said fact management table indexed with an entry corresponding to said fact knowledge, and
  (d4) a jump instruction which branches to an instruction sequence of a condition part of a rule referring to said fact knowledge modified by said instruction (d1), a target address of said jump instruction being included in said first address of said fact management table indexed by an entry corresponding to said fact management table.

* * * * *